United States Patent [19]

Brown

[11] 4,357,137

[45] Nov. 2, 1982

[54] SHAFT COUPLING

[75] Inventor: Harry W. Brown, Annapolis, Md.

[73] Assignee: Arinc Research Corporation, Annapolis, Md.

[21] Appl. No.: 179,006

[22] Filed: Aug. 18, 1980

[51] Int. Cl.³ .............................................. F16D 3/52
[52] U.S. Cl. ..................................... 464/75; 464/150; 464/159
[58] Field of Search ..................... 64/9 R, 14, 27 NM; 464/75, 74, 150, 158, 159

[56] References Cited

U.S. PATENT DOCUMENTS

| | | | |
|---|---|---|---|
| 1,630,544 | 5/1927 | Smith et al. | 64/9 R |
| 2,235,605 | 3/1941 | Bugatti | 64/27 NM |
| 2,269,799 | 1/1942 | Upson | 64/27 NM |
| 2,769,323 | 11/1956 | O'Malley | 64/9 R |
| 2,878,681 | 3/1959 | Howlett | 64/9 R |
| 3,257,860 | 6/1966 | Runde et al. | 64/27 NM |
| 3,834,182 | 9/1974 | Trask et al. | 64/9 R |
| 4,098,096 | 7/1978 | Chard et al. | 64/9 R |

FOREIGN PATENT DOCUMENTS 786585  11/1957  United Kingdom ................... 64/14

OTHER PUBLICATIONS

M. L. Valtierra, et al., Preprint No. 77-LC-6B-1, Oct. 1977.
H. W. Brown, Journal of Engineering For Industry, vol. 101, No. 4, Nov. 1979.

Primary Examiner—Ira S. Lazarus
Assistant Examiner—Magdalen Moy
Attorney, Agent, or Firm—Stevens, Davis, Miller & Mosher

[57] ABSTRACT

A long wearing shaft coupling is comprised of metallic male and female members, and a plastic insert. The plastic insert is interference fitted into the female member, and the male member is slip fitted into the insert. The male member is provided with a number of part-circular shaped in transverse cross-section, radially outwardly extending projections which correspond to an equal number of similarly shaped and situated recesses in the insert. The plastic insert transmits the load between the male member and the female member, and is readily replaceable. The projections can be of a slightly smaller radius than the recesses, to allow for misalignments in the shaft. The slip fit nature allows for easy disassembling of the coupling.

9 Claims, 4 Drawing Figures

SHAFT COUPLING

BACKGROUND OF THE INVENTION

1. Field of the Invention

This invention relates to shaft couplings, and more particularly, couplings which can accommodate minor misalignments in the shafts to be connected, wherein male and female members are connected via an insert.

2. Description of the Prior Art

In the past, shaft couplings have been subject to excessive wear and have needed frequent replacement. This has often resulted from fretting corrosion and spalling due to the metal-metal contacts. These couplings have also been difficult to disassemble when replacement of parts was necessary. Another problem encountered in the prior art is the less than maximum load-bearing contact area used. Prior shaft couplings have been relatively complex and have required means for providing and/or retaining lubrication. Also, in the prior art, there has been no tolerance for minor misalignment of the shafts, such as often occurs in common use. Prior non-metallic couplings have had the problem of uneven stress distribution, which resulted in increased stress and wear.

SUMMARY OF THE INVENTION

It is an object of this invention to provide a long wearing shaft coupling.

It is a further object of this invention to provide a shaft coupling which is easily assembled and disassembled.

It is still a further object of this invention to provide a shaft coupling capable of tolerating minor misalignments of the shafts.

It is a still further object of this invention to provide a shaft coupling of simple and economical construction and manufacture.

The above objects and others are obtained by providing a shaft coupling comprising a metal female member, a plastic insert, and a metal male member. The plastic insert is of ring-shaped cross-section and has a number of radially outwardly extending, symmetrically situated, part-circular shaped in transverse cross-section recesses as part of its inner surface. The male member is provided with an equal number of similarly shaped and situated projections. The radius of curvature of the projections is equal to or slightly smaller than that of the recesses. This allows for a slip fit between the male member and the insert. When the radius of curvature of the projection is smaller than that of the recesses, the clearance between the projections and recesses allows for minor misalignments of the shafts. The insert can be made of a self-lubricating plastic, or lubricants such as polytetrafluoroethylene or graphite can be added to the plastic resin before formation of the insert.

DESCRIPTION OF THE PREFERRED EMBODIMENT

Figure 1:
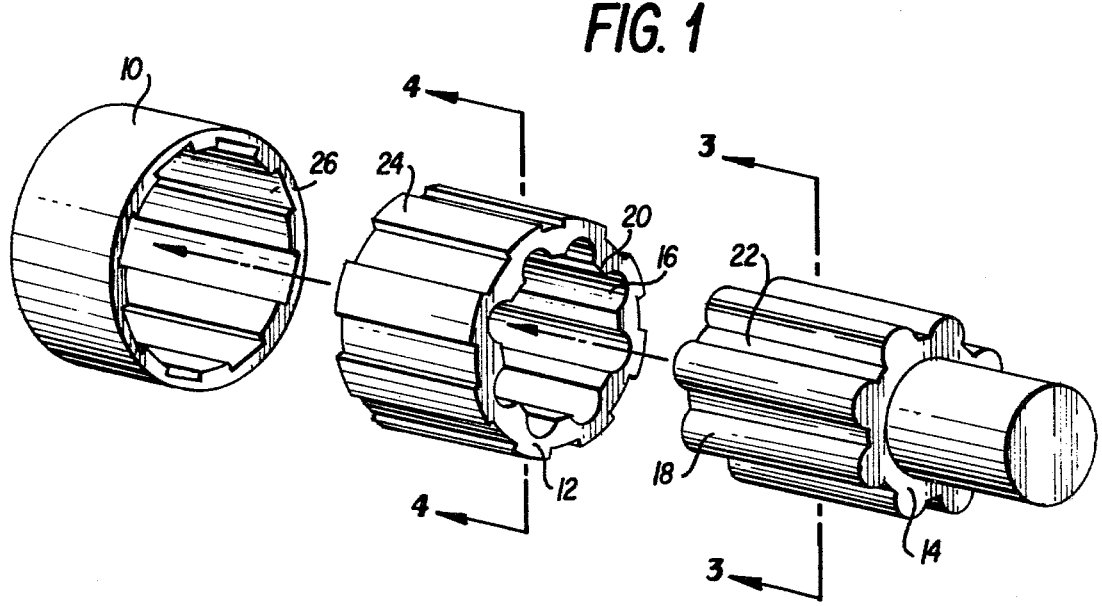
FIG. 1 is an exploded view of the coupling of the present invention.
Figure 3:
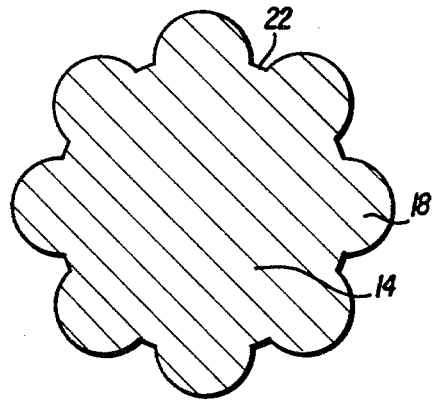
FIG. 3 is a transverse cross-sectional view of the male member.
Figure 4:
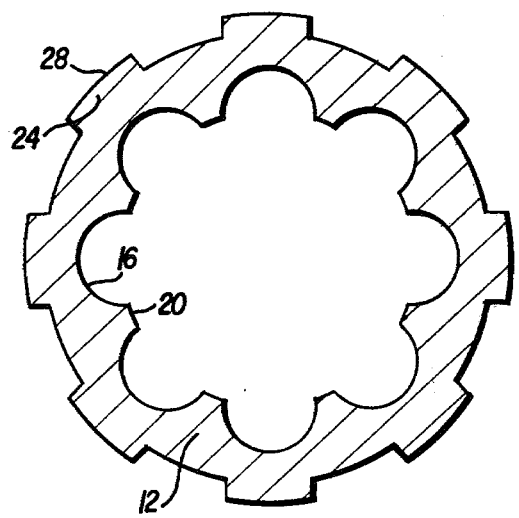
FIG. 4 is a transverse cross-sectional view of the insert.

Referring to FIG. 1, the coupling of the present invention is made up of a metallic female member 10, a plastic insert 12, and a metallic male member 14. The insert 12 is interference fitted into the female member 10, and the male member 14 is slip fitted into the insert 12.

The insert 12 is substantially tubular. A plurality of part-circular shaped, symmetrically situated recesses 16 extend radially outwardly as part of the inner surface of the insert 12. The centers of curvature of the recesses 16 are located an equal radial distance from the center of the insert. The recesses extend no closer to the center of the insert than the form diameter of the insert. For the purposes of this disclosure, the form diameter is defined as an imaginary circle whose periphery is defined by the centers of curvature of the recesses. The insert may be manufactured by any desired method, such as injection or compression molding or, machining.

The male member 14 is provided with projections 18 corresponding in shape, situation, and number to the recesses 16 in the insert 12. These projections 18 extend radially outwardly from the generally cylindrical male member 14, and also extend longitudinally for substantially the length of the male member 14. The projections 18 extend no closer to the center of the male member than the form diameter (a second imaginary circle) of the male member. The form diameter of the male member 14 is defined in a manner similar to and is of the same diameter as the form diameter of the insert 12. The part-circular shape of the projections and recesses has been found to provide the greatest load-bearing contact area and the best load distribution. At least six projections and recesses are necessary for optimum performance. The arc cut by the projections and recesses is preferably 180° or slightly less.

The radius of curvature of the projections 18 is equal to or slightly less than the radius of curvature of the recesses 16. This allows for the slip fit relationship. When the radius of curvature of the projections 18 is less than that of the recesses 16, minor misalignments between shafts can be tolerated because of the clearance between the projections 18 and the recesses 16. Of course, the amount of misalignment that can be tolerated depends upon the clearance and hence the radii of curvature. A difference between the radii of curvature of not more than approximately 7% is contemplated.

Depending on the number and spacing of the recesses 16 and the projections 18, there may be provided generally flat ridges 20 between the recesses 16, and generally flat bottomed valleys 22 between the projections 18.

If desired, retention means (not shown) may be provided inside the insert to inhibit axial movement of the male member 14.

An even number of projections 18 and recesses 16 is preferred for ease of determining diameters for quality control purposes and for ease of manufacture.

Figure 2:
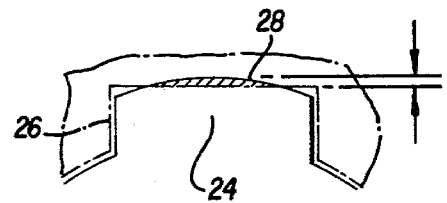
FIG. 2 is a cross-sectional view of an example of an interference fit between the female member and the insert.

The insert 12 is interference fitted into the female member 10. The outer surface of the insert is provided with splines 24 which substantially correspond to grooves 26 extending radially outwardly as part of the inner surface of the female member 10. As can be seen in FIGS. 1 and 2, the splines 24 are provided with generally outwardly extending straight sides and a slightly outwardly arcuate upper surface 28. The depressions 26 have generally outwardly extending straight sides, and are generally rectangular in cross-section. This provides the interference fit shown in FIG. 2. A retention ring (not shown) may be provided on the insert 12 to inhibit axial movement of the insert in the female member 10. In the preferred embodiment, each spline 24 is centered over and located radially outwardly from a corresponding one of the recesses 16. This arrangement has been found to provide the most strength for the insert, which transmits the load between the male member and the female member.

Although the shape shown for the interference fit is the preferred shape, any shape may be used for the interference fit, thus allowing the present invention to be used with existing equipment without modification of that equipment. Also, it is contemplated that means other than an interference fit may be used for securing the insert 12 to the female member 10, such as bonding, or screws or other mechanical fasteners.

To achieve optimum coupling performance, it is expected that a plastic having an ultimate compressive strength of at least 25,000 p.s.i. and an ultimate tensile strength of at least 6,000 p.s.i. should be selected. Of course, the selection of material is largely influenced by factors such as torsional loading, fatigue resistance, environmental characteristics, and forming properties desired for manufacturing. Materials suitable for the insert include polyimides (such as parts marketed under the name Vespel ® by E. I. du Pont de Nemours and Company) and poly(amide-imide) (such as products marketed under the name Torlon ® by Amoco). These belong to a family of crystalline and amorphous polymers. If desired, secondary agents such as polytetrafluoroethylene, graphite, or glass may be added to the polymeric resins before formation of the insert to enhance its mechanical or self-lubricating properties. The high elasticity of these resins allows the insert to strain under load without abnormal deformation of the insert. For the purposes of this application, this class of resins will be characterized as "thermostable plastic", i.e., maintaining a high percentage of their strength at high operating temperatures, such as about 300° F.

What is claimed is:

1. A shaft coupling comprising:
a metallic female member;
a substantially tubular plastic insert substantially non-rotatably secured to said female member;
a metallic male member slip fitted in said insert;
said insert being substantially ring-shaped in transverse cross-section and having an inner surface and an outer surface, said inner surface being defined by at least six equally circumferentially spaced radially outwardly extending substantially straight longitudinally extending recesses part-circular in transverse cross-section, said recesses extending radially outwardly a substantially uniform distance for their entire length, the centers of curvature of said recesses being located on a first imaginary circle about the transverse cross-sectional center of said insert, each recess extending no closer to the cross-sectional center of the insert than the imaginary circle;
said male member being substantially cylindrical and comprising a plurality of radially outwardly extending equally circumferentially spaced substantially straight longitudinally extending projections part-circular in transverse cross-section, said projections extending radially outwardly a substantially uniform distance for their entire length, said projections corresponding exactly in number and substantially in situation to the recesses in said insert, the centers of curvature of said projections being located on a second imaginary circle, about the transverse cross-sectional center of the male member having the same diameter as the first circle, each projection being no closer to the transverse cross-sectional center of the male member than the second circle.

2. A shaft coupling comprising:
a metallic female member;
a substantially tubular thermostable plastic insert interference fitted in said female member;
a metallic male member slip fitted in said insert;
said insert being substantially ring-shaped in transverse cross-section and having an inner surface and an outer surface, said inner surface being defined by at least six equally circumferentially spaced radially outwardly extending substantially straight longitudinally extending recesses part-circular in transverse cross-section, said recesses extending radially outwardly a substantially uniform distance for their entire length, the centers of curvature of said recesses being located on a first imaginary circle about the transverse cross-sectional center of said insert, each recess extending no closer to the cross-sectional center of the insert than the imaginary circle;
said male member being substantially cylindrical and comprising a plurality of radially outwardly extending equally circumferentially spaced substantially straight longitudinally extending projections part-circular in transverse cross-section, said projections extending radially outwardly a substantially uniform distance for their entire length, said projections corresponding exactly in number and substantially in situation to the recesses in said insert, the centers of curvature of said projections being located on a second imaginary circle, about the transverse cross-sectional center of the male member having the same diameter as the first circle, each projection being no closer to the transverse cross-sectional center of the male member than the second circle.

3. A shaft coupling comprising:
a metallic female member;
a substantially tubular thermostable plastic insert interference fitted in said female member through a spline connection;
a metallic male member slip fitted in said insert;
said insert being substantially ring-shaped in transverse cross-section and having an inner surface and an outer surface, said inner surface being defined by at least six equally circumferentially spaced radially outwardly extending substantially straight longitudinally extending recesses part-circular in transverse cross-section, said recesses extending radially outwardly a substantially uniform distance for their entire length, the centers of curvature of said recesses being located on a first imaginary circle about the transverse cross-sectional center of said insert, each recess extending no closer to the cross-sectional center of the insert than the imaginary circle;
said male member being substantially cylindrical and comprising a plurality of radially outwardly extending equally circumferentially spaced substantially straight longitudinally extending projections part-circular in transverse cross-section, said projections extending radially outwardly a substantially uniform distance for their entire length, said projections corresponding exactly in number and substantially in situation to the recesses in said insert, the centers of curvature of said projections being located on a second imaginary circle, about the transverse cross-sectional center of the male member having the same diameter as the first circle, each projection being no closer to the transverse cross-sectional center of the male member than the second circle.

4. A shaft coupling comprising:

a ring-shaped metallic female member having an outer surface and an inner surface defined by a plurality of circumferentially spaced radially outwardly extending radially inwardly opening substantially straight longitudinally extending substantially rectangular grooves therein, each of said grooves having substantially straight outwardly extending side walls and a substantially straight top wall interconnecting the side walls;

a substantially tubular thermostable plastic insert interference fitted in said female member;

a metallic male member slip fitted in said insert;

said insert being substantially ring-shaped in transverse cross-section and having an inner surface and an outer surface, said inner surface of said insert being defined by at least six equally circumferentially spaced radially outwardly extending recesses part-circular in transverse cross-section, cutting an arc equal to or slightly less than 180°, said recesses extending radially outwardly a substantially uniform distance for their entire length, the centers of curvature of said recesses being located on a first imaginary circle about the transverse cross-sectional center of said insert, each recess extending no closer to the cross-sectional center of the insert than the imaginary circle, said outer surface of said insert being defined by a plurality of circumferentially spaced radially outwardly extending substantially straight longitudinally extending splines, each of said splines having substantially straight outwardly extending side walls and a convex top wall interconnecting the side walls of the splines, each of said splines mating with and substantially filling a corresponding one of said grooves, said splines being of greater radial extent than the grooves to produce the interference fit between the insert and the female member, said splines and said grooves corresponding exactly in number to the recesses in said insert, each of said splines and said corresponding grooves being centered relative to and disposed directly radially outwardly of a corresponding one of said recesses;

said male member being substantially cylindrical and comprising a plurality of radially outwardly extending equally circumferentially spaced projections part-circular in transverse cross-section, cutting an arc equal to or slightly less than 180°, said projections extending radially outwardly a substantially uniform distance for their entire length, said projections corresponding exactly in number and substantially in situation to the recesses in said insert, the centers of curvature of said projections being located on a second imaginary circle, about the transverse cross-sectional center of the male member having the same diameter as the first circle, each projection being no closer to the transverse cross-sectional center of the male member than the second circle.

5. A shaft coupling as claimed in any one of claims 1 through 4 wherein the radius of curvature of said projections is equal to the radius of curvature of said recesses.

6. A shaft coupling as claimed in any one of claims 1 through 4 wherein the radius of curvature of the projections is slightly less than the radius of curvature of the recesses.

7. A shaft coupling as claimed in any one of claims 1 through 4 further comprising substantially flat bottomed valleys between each pair of next adjacent ones of said projections and substantially flat ridges between each pair of next adjacent ones of said recesses.

8. A shaft coupling as claimed in any one of claims 1 through 4 wherein there are an even number of recesses.

9. A shaft coupling as claimed in any one of claims 2 through 4 wherein the thermostable plastic used for the insert has a compressive strength of at least 25,000 p.s.i. and a tensile strength of at least 6,000 p.s.i.

* * * * *